US007360204B2

(12) United States Patent
Bates et al.

(10) Patent No.: US 7,360,204 B2
(45) Date of Patent: Apr. 15, 2008

(54) GROUPING BREAKPOINTS BY A CRITERIA

(75) Inventors: Cary Lee Bates, Rochester, MN (US); Paul W. Buenger, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 10/431,921

(22) Filed: May 8, 2003

(65) Prior Publication Data
US 2004/0226003 A1 Nov. 11, 2004

(51) Int. Cl.
*G06F 9/44* (2006.01)
(52) U.S. Cl. .................. 717/129; 717/124; 717/127
(58) Field of Classification Search .............. 717/129, 717/124, 127
See application file for complete search history.

(56) References Cited

U.S. PATENT DOCUMENTS

| 5,740,413 A * | 4/1998 | Alpert et al. ............... 714/34 |
| 5,845,125 A * | 12/1998 | Nishimura et al. .......... 717/129 |
| 6,077,312 A * | 6/2000 | Bates et al. ................. 717/129 |
| 6,091,896 A * | 7/2000 | Curreri et al. .............. 717/129 |
| 6,240,545 B1 * | 5/2001 | Carmichael et al. ......... 717/129 |
| 6,249,907 B1 * | 6/2001 | Carter et al. ................ 717/129 |
| 6,263,489 B1 * | 7/2001 | Olsen et al. ................ 717/129 |
| 6,295,613 B1 | 9/2001 | Bates et al. |
| 6,378,125 B1 | 4/2002 | Bates et al. |
| 6,493,868 B1 * | 12/2002 | DaSilva et al. ............. 717/129 |
| 6,728,954 B1 * | 4/2004 | Kesselman et al. ......... 717/129 |
| 6,848,097 B1 * | 1/2005 | Alverson et al. ........... 717/124 |

OTHER PUBLICATIONS

Nathan Fielder, "[jswat-dev] New breakpoint design", 2001, p. 1-3, [retreived from online http://www.bluemarsh.com/pipermail/jswat-dev/2001-March/000064.html].*

* cited by examiner

*Primary Examiner*—Wei Y. Zhen
*Assistant Examiner*—Qamrun Nahar
(74) *Attorney, Agent, or Firm*—Owen J. Gamon

(57) ABSTRACT

A method, apparatus, system, and signal-bearing medium that in an embodiment find all those breakpoints that meet a selection criteria and add the breakpoints to a breakpoint group. In various embodiments, the selection criteria may be a condition criteria, a hierarchy criteria, or a skipping criteria. In this way, the programmer is freed from needing to individually add breakpoints to the group and all the breakpoints in the group may be enabled, disabled, or removed as a group.

5 Claims, 9 Drawing Sheets

GROUPING BREAKPOINTS BY A CRITERIA

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention generally relates to computer programming and more specifically relates to grouping breakpoints in order to debug a computer program.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful than just a few years ago.

As the sophistication and complexity of computer software increase, the more difficult the software is to debug. Bugs are problems, faults, or errors in a computer program. Locating, analyzing, and correcting suspected faults in a computer program is a process known as "debugging." Typically, a programmer uses another computer program commonly known as a "debugger" to debug a program under development.

Conventional debuggers typically support two primary operations to assist a computer programmer. A first operation supported by conventional debuggers is a "step" function, which permits a computer programmer to process instructions (also known as "statements") in a computer program one-by-one and see the results upon completion of each instruction. While the step operation provides a programmer with a large amount of information about a program during its execution, stepping through hundreds or thousands of program instructions can be extremely tedious and time consuming, and may require a programmer to step through many program instructions that are known to be error-free before a set of instructions to be analyzed are executed.

To address this difficulty, a second operation supported by conventional debuggers is a breakpoint operation, which permits a computer programmer to identify with a breakpoint a precise instruction for which it is desired to halt execution of a computer program during execution. As a result, when a computer program is executed by a debugger, the program executes in a normal fashion until a breakpoint is reached. The debugger then stops execution of the program and displays the results of the program to the programmer for analysis.

Typically, step operations and breakpoints are used together to simplify the debugging process. Specifically, a common debugging operation is to set a breakpoint at the beginning of a desired set of instructions to be analyzed and then begin executing the program. Once the breakpoint is reached, the debugger halts the program, and the programmer then steps through the desired set of instructions line-by-line using the step operation. Consequently, a programmer is able to more quickly isolate and analyze a particular set of instructions without having to step through irrelevant portions of a computer program.

Thus, once the programmer determines the appropriate places in the program and sets breakpoints at those appropriate places, the breakpoints can be a powerful tool. But, many breakpoints may be needed, and the breakpoints needed may change over time as the programmer gains more information about the problem being debugged. Hence, determining the appropriate places in the program, setting breakpoints at those places, and removing the breakpoints that are no longer needed can be an arduous task.

To make setting and removing breakpoints easier, some conventional debuggers have breakpoint groups. The primary use of these groups is to form a collection of breakpoints, which can be enabled and disabled all at once. Breakpoint groups allow the programmer to more rapidly adjust the debug environment and not be burdened by excessive and undesired breakpoint hits. While breakpoint groups can be a real time saver once they are set up, in situations as dynamic as debugging, programmers often experience difficulty in deciding what breakpoints should belong to a group.

Without a better way to manage breakpoints, the debugging of programs will continue to be a difficult and time-consuming task, which delays the introduction of software products and increases their costs.

SUMMARY

A method, apparatus, system, and signal-bearing medium are provided that in an embodiment find all those breakpoints that meet a selection criteria and add those breakpoints to a breakpoint group. In various embodiments, the selection criteria may be a condition criteria, a hierarchy criteria, or a skipping criteria. In this way, the programmer is freed from needing to individually add breakpoints to the group and all the breakpoints in the group may be enabled, disabled, and removed as a group.

DETAILED DESCRIPTION

Figure 1:
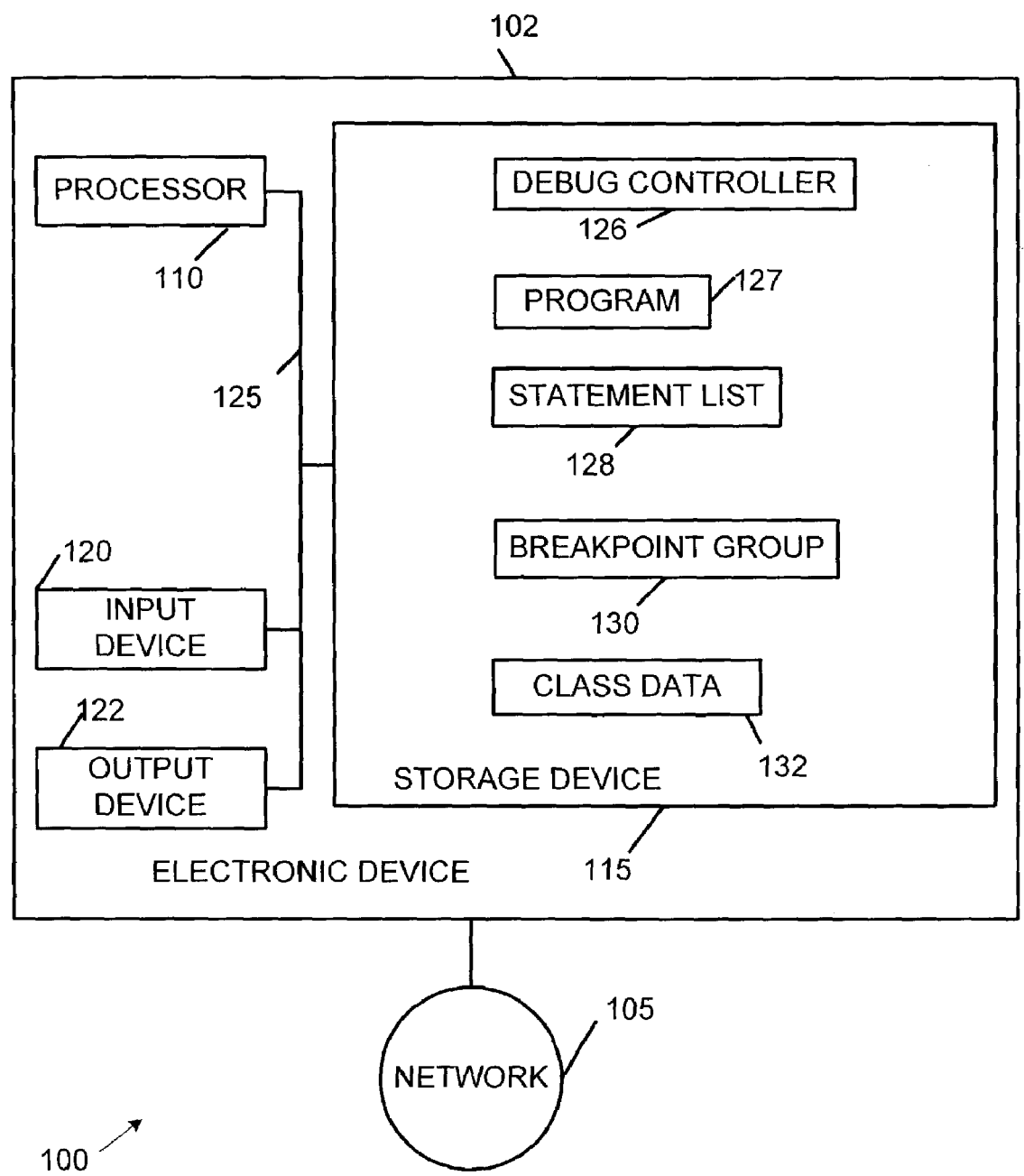
FIG. 1 depicts a block diagram of an example system for implementing an embodiment of the invention.

FIG. 1 depicts a block diagram of an example system 100 for implementing an embodiment of the invention. The system 100 includes an electronic device 102 connected to a network 105. Although only one electronic device 102 and one network 105 are shown, in other embodiments any number or combination of them may be present. In another embodiment, the network 105 is not present.

The electronic device 102 includes a processor 110, a storage device 115, an input device 120, and an output device 122, all connected directly or indirectly via a bus 125. The processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 110 executes instructions and includes that portion of the electronic device 102 that controls the operation of the entire electronic device. Although not depicted in FIG. 1, the processor 110 typically includes a control unit that organizes data and program storage in memory and transfers data and other information between the various parts of the electronic device 102. The processor 110 reads and/or writes code and data to/from the storage device 115, the network 105, the input device 120, and/or the output device 122.

Although the electronic device 102 is shown to contain only a single processor 110 and a single bus 125, embodiments of the present invention apply equally to electronic devices that may have multiple processors and multiple buses with some or all performing different functions in different ways.

The storage device 115 represents one or more mechanisms for storing data. For example, the storage device 115 may include read only memory (ROM), random access memory (RAM), magnetic disk storage media, optical storage media, flash memory devices, and/or other machine-readable media. In other embodiments, any appropriate type of storage device may be used. Although only one storage device 115 is shown, multiple storage devices and multiple types of storage devices may be present. Further, although the electronic device 102 is drawn to contain the storage device 115, it may be distributed across other electronic devices, such as devices connected to the network 105. The storage device 115 includes a debug controller 126, a program 127, a statement list 128, a breakpoint group 130, and class data 132, all of which may in various embodiments have any number of instances. The debug controller 126 creates the breakpoint group 130 in order to debug the program 127. In an embodiment, the debug controller 126 includes instructions capable of executing on the processor 110 or statements capable of being interpreted by instructions executing on the processor 110 to display the user interfaces as further described below with reference to FIGS. 2 and 5 and to carry out the functions as further described below with reference to FIGS. 4, 6, 7, 8, and 9 using the data structure of FIG. 3. In another embodiment, the debug controller 126 may be implemented in hardware via logic gates and/or other appropriate hardware techniques.

The program 127 includes instructions capable of executing on the processor 110 or statements capable of being interpreted by instructions executing on the processor 110. The program 127 is to be debugged using the debug controller 126.

The statement list 128 includes information about statements in the program 127, and the debug controller 126 may use the statement list 128 as input to carry out various embodiments of the invention. In an embodiment, the statement list 128 is generated by a compiler (not shown), but in other embodiments the statement list may be generated by any appropriate mechanism. The statement list 128 is further described below with reference to FIG. 3.

The breakpoint group 130 is generated by the debug controller 126 and contains information about the statements in the program 127 where breakpoints are to be set. The debug controller 126 may enable, disable, and remove all the breakpoints in the breakpoint group 130 as a group.

The class data 132 includes information about the parent-child relationships between classes and their methods for the program 127 in the embodiment where the program 127 is an object-oriented program. In another embodiment, the class data 132 is not present. The use of the class data 132 is further described below with reference to FIGS. 5, 6, 7, and 8.

Although the debug controller 126, the program 127, the statement list 128, the breakpoint group 130, and the class data 132 are illustrated as being contained within the storage device 115 in the electronic device 102, in other embodiments some or all of them may be on different electronic devices and may be accessed remotely, e.g., via the network 105.

The input device 120 may be a keyboard, mouse or other pointing device, trackball, touchpad, touchscreen, keypad, microphone, voice recognition device, or any other appropriate mechanism for the user to input data to the electronic device 102 and/or to manipulate the user interfaces of the electronic device 102. Although only one input device 120 is shown, in another embodiment any number and type of input devices may be present. The input device 120 may be used to interact with and manipulate the user interfaces of FIGS. 2 and 5, as further described below.

The output device 122 is that part of the electronic device 102 that presents output to the user. The output device 122 may be a cathode-ray tube (CRT) based video display well known in the art of computer hardware. But, in other embodiments the output device 122 may be replaced with a liquid crystal display (LCD) based or gas, plasma-based, flat-panel display. In still other embodiments, any appropriate display device may be used. In other embodiments, a speaker or a printer may be used. In other embodiments any appropriate output device may be used. Although only one output device 122 is shown, in other embodiments, any number of output devices of different types or of the same type may be present. The output device 122 may display or otherwise present the user interfaces of FIGS. 2 and 5, as further described below.

The bus 125 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

The electronic device 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, and mainframe computers are examples of other possible configurations of the electronic device 102. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 105 may be any suitable network or combination of networks and may support any appropriate protocol suitable for communication of data and/or code to/from the electronic device 102. In various embodiments, the network 105 may represent a storage device or a combination of storage devices, either connected directly or indirectly to the electronic device 102. In an embodiment, the network 105 may support Infiniband. In another embodiment, the network 105 may support wireless communications. In another embodiment, the network 105 may support hard-wired communications, such as a telephone line or cable. In another embodiment, the network 105 may support the Ethernet IEEE (Institute of Electrical and Electronics Engineers) 802.3x specification. In another embodiment, the network 105 may be the Internet and may support IP (Internet Protocol). In another embodiment, the network 105 may be a local area network (LAN) or a wide area network (WAN). In another embodiment, the network 105 may be a hotspot service provider network. In another embodiment, the network 105 may be an intranet. In another embodiment, the network 105 may be a GPRS (General Packet Radio Service) network. In another embodiment, the network 105 may be any appropriate cellular data network or cell-based radio network technology. In another embodiment, the network 105 may be an IEEE 802.11B wireless network. In still another embodiment, the network 105 may be any suitable network or combination of networks. Although one network 105 is shown, in other embodiments any number of networks (of the same or different types) may be present.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the electronic device 102, and that, when read and executed by one or more processors in the electronic device 102, cause the electronic device to perform the steps necessary to execute steps or elements embodying the various aspects of an embodiment of the invention.

Moreover, while embodiments of the invention have and hereinafter will be described in the context of fully functioning electronic devices, the various embodiments of the invention are capable of being distributed as a program product in a variety of forms, and the invention applies equally regardless of the particular type of signal-bearing medium used to actually carry out the distribution. The programs defining the functions of this embodiment may be delivered to the electronic device 102 via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, e.g., the network 105, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
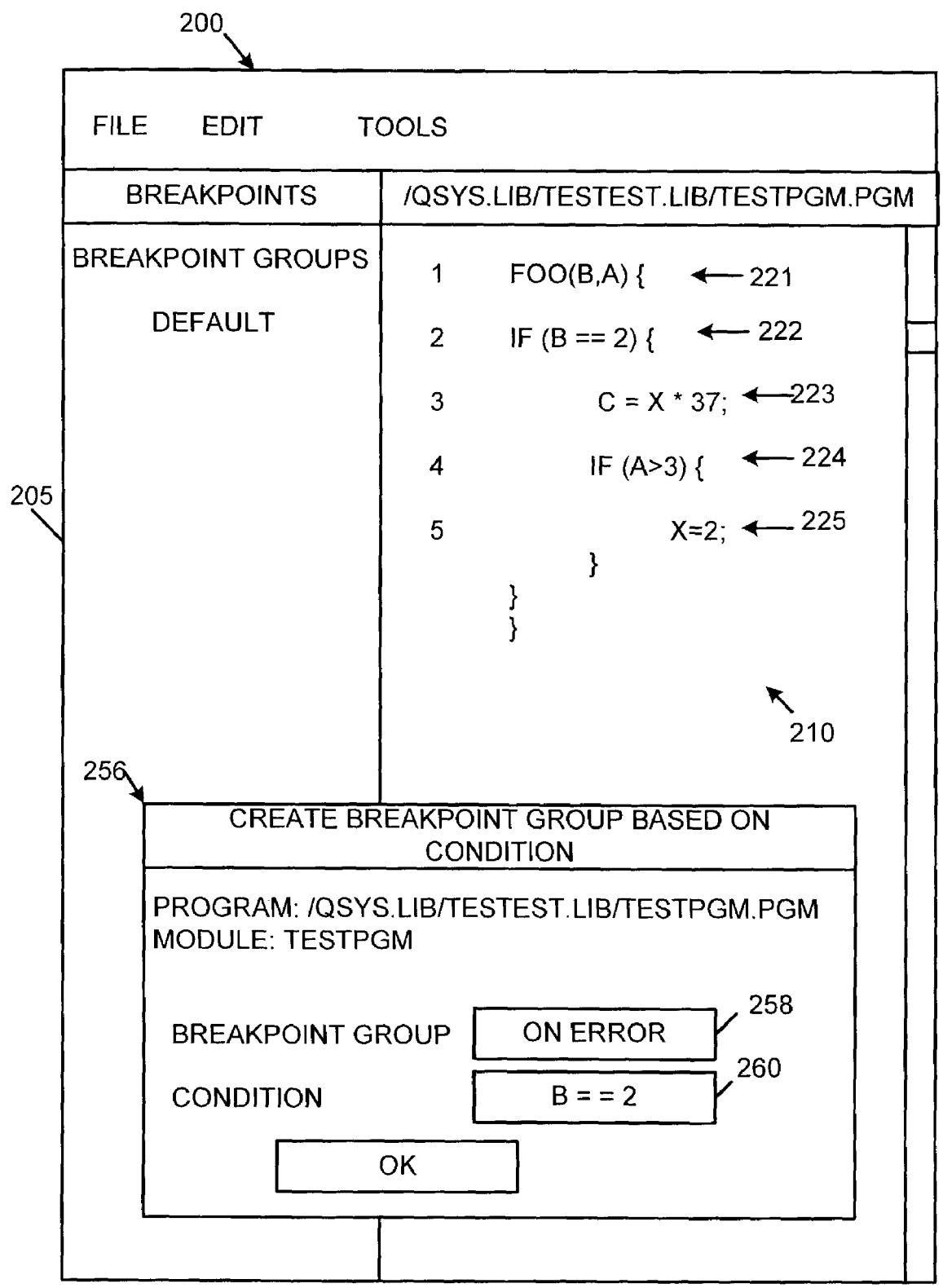
FIG. 2 depicts a pictorial representation of an example user interface for requesting the creation of a breakpoint group based on a condition, according to an embodiment of the invention.

FIG. 2 depicts a pictorial representation of an example user interface 200 for requesting the creation of the breakpoint group 130 based on a condition, according to an embodiment of the invention. Displayed within the user interface 200 are a breakpoint group panel 205, a program listing panel 210, and a dialog 256.

The breakpoint group panel 205 includes a list of groups of breakpoints that the user may request the debug controller 126 to enable, disable, and remove as a group. The user may further request that the debug controller 126 create a new breakpoint group to be added to the breakpoint group panel 205 via the dialog 256, as further described below.

The program listing panel 210 includes a list of statements in the program 127 to be debugged using the breakpoint groups listed in the breakpoint group panel 205. Shown in the program listing panel 210 are statements 221, 222, 223, 224, and 225, although in other embodiments any number and type of statements may be present.

The dialog 256 includes a breakpoint group name field 258 and a condition field 260. In the example shown, the user has entered "on error" in the breakpoint group name field 258 as the name of the breakpoint group to be created. The user has also entered "B==2" as the condition in the condition field 260. Thus, the user is requesting the debug controller 126 to create a breakpoint group named "on error" that includes breakpoints at all statements that are executed only if the condition B==2 is true, i.e., if the statement is executed, then the condition have been true. In the program listed in the program listing panel 210, B==2 must be true in order for the statements 223, 224, and 225 to be executed, so the debug controller 126 adds breakpoints for statements 223, 224, and 225 (if breakpoints for the statements exist) to the group "on error" in response to the input for the dialog 256, as further described below with reference to FIGS. 3 and 4.

The data values shown in FIG. 2 are exemplary only, and in other embodiments any appropriate data may be used.

Figure 3:
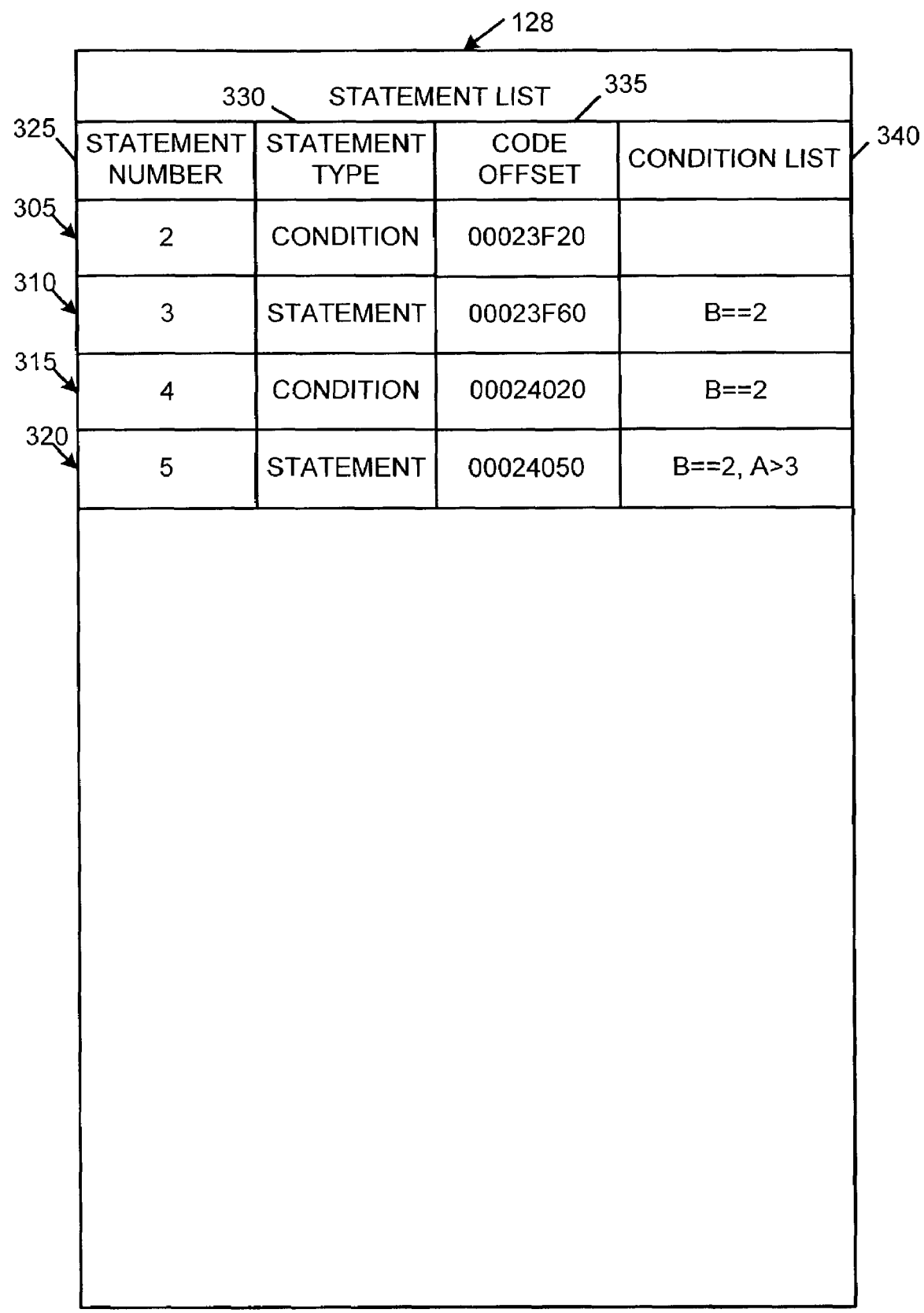
FIG. 3 depicts a pictorial representation of an example data structure that may be used to create a breakpoint group based on a condition, according to an embodiment of the invention.

FIG. 3 depicts a pictorial representation of an example statement list data structure 128, which may be used to create the breakpoint group 130 based on a condition, according to an embodiment of the invention. The statement list 128 includes an entry or record for each statement in the program 127 to be debugged, such as example entries 305, 310, 315, and 320. Although the embodiment shown in FIG. 3 shows four entries 305, 310, 315, and 320 in the statement list 128, in other embodiments any number of entries may be present. Each entry includes a statement number field 325, a statement type field 330, a code offset field 335, and a condition list field 340, although in other embodiments more or fewer fields may be present.

The statement number field 325 may include values corresponding to the order of the statements shown in the program listing panel 210. The statement type field 330 may include the type of the statement in the program 127, e.g., the statement 222 with statement number 2 is a condition, the statement 223 with statement number 3 is a statement, the statement 224 with statement number 4 is a condition, and the statement 225 with statement number 5 is a statement. The code offset field 335 may include an offset from the beginning of the program 127 for the binary object code associated with the statement. The condition list field 340 includes a list of the conditions that must be met for the associated statement to be executed. For example, statement number 2 is always executed (it is unconditional), so its associated value in the condition list 340 is empty; statement number 3 is executed only if B=2, so its associated value in the condition list 340 contains B==2; statement number 4 is executed only if B==2, so its associated value in the condition list 340 contains B==2; and statement number 5 is executed only if both B==2 and A>3, so its associated value in the condition list 340 contains B==2 and A>3.

The values shown in FIG. 3 are exemplary only, and in other embodiments any appropriate values may be present.

Figure 4:
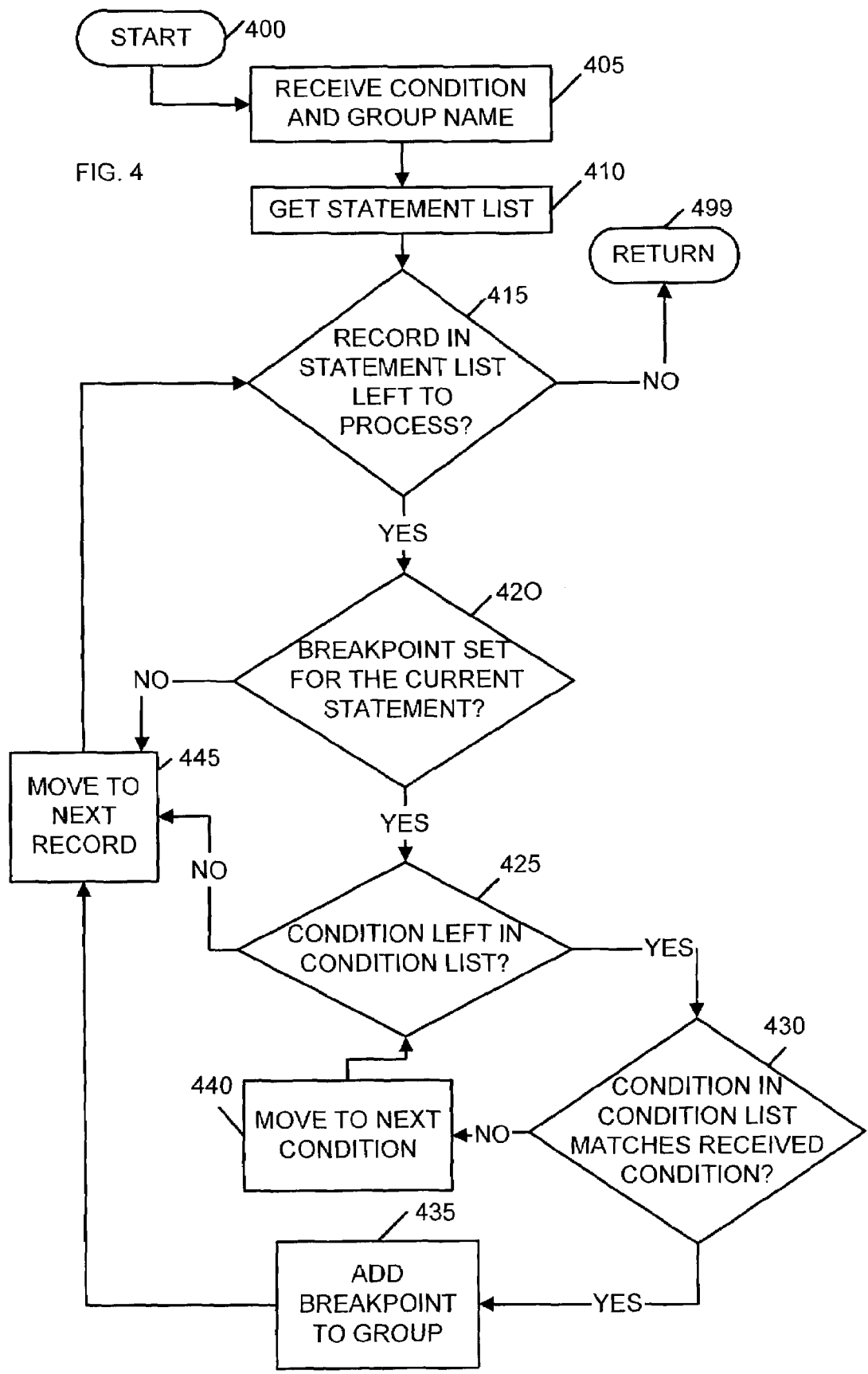
FIG. 4 depicts a flowchart of example processing to create a breakpoint group based on a condition, according to an embodiment of the invention.

FIG. 4 depicts a flowchart of example processing to create the breakpoint group 130 based on a condition, according to an embodiment of the invention. The logic of FIG. 4 may be invoked from the dialog 256, as previously described above with reference to FIG. 2. Control begins at block 400. Control then continues to block 405 where the debug controller 126 receives a condition and a group name, such the condition 260 and the group name 258. Control then continues to block 410 where the debug controller 126 retrieves the statement list 128 associated with the program 127 to be debugged. Control then continues to block 415 where the debug controller 126 determines whether there are any records left to process in the statement list 128. If the determination is false, then control continues to block 499 where the function returns.

If the determination at block 415 is true, then control continues to block 420 where the debug controller 126 determines whether there is a breakpoint set for the statement number 325 in the current record of the statement list 128. If the determination at block 420 is false, then control continues to block 445 where the debug controller 126 moves to the next record in the statement list 128. Control then returns to block 415, as previously described above.

If the determination at block 420 is true, then control continues from block 420 to block 425 where the debug controller 126 determines whether there is an unprocessed condition left in the condition list 340 of the current record in the statement list 128. If the determination at block 425 is false, then control continues to block 445, as previously described above.

If the determination at block 425 is true, then control continues to block 430 where the debug controller 126 determines whether the current condition in the condition list 340 of the current record in the statement list 128 matches the received condition 260.

If the determination at block 430 is false, then control continues to block 440 where the debug controller 126 moves to the next condition in the condition list 340 of the current record in the statement list 128. Control then returns to block 425, as previously described above.

If the determination at block 430 is true, then control continues to block 435 where the debug controller 126 adds the breakpoint that is set for the current statement to the breakpoint group 130. Control then continues to block 445, as previously described above.

In this way, the debug controller 126 finds all of the currently set breakpoints in the program 127 that meet the condition 260 and adds them to the breakpoint group 130. The user may then request that the debug controller 126 enable/disable/remove as a group all of the breakpoints in the breakpoint group 130.

Figure 5:
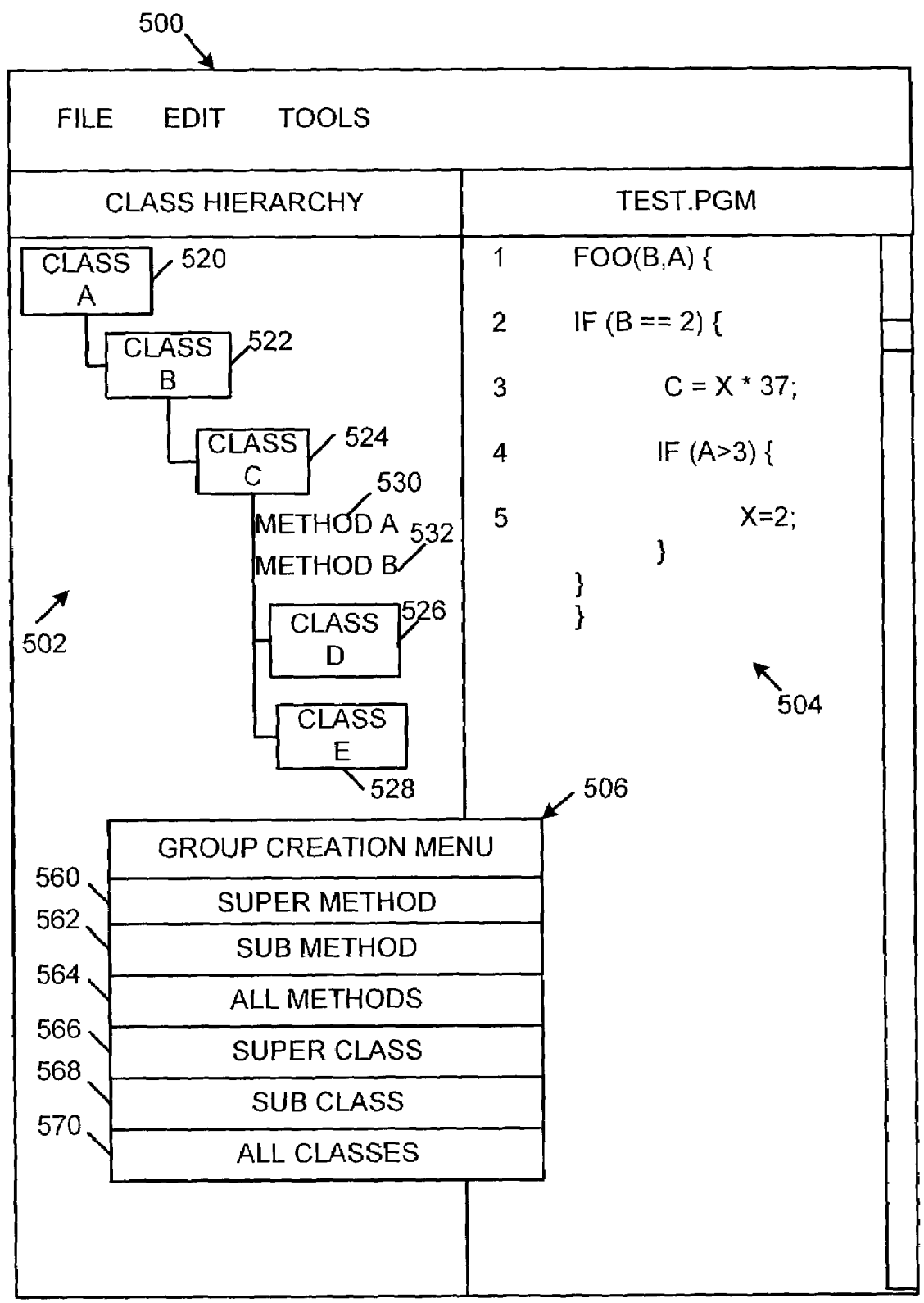
FIG. 5 depicts a pictorial representation of an example user interface for requesting the creation of a breakpoint group based on a hierarchy, according to an embodiment of the invention.

FIG. 5 depicts a pictorial representation of an example user interface 500 for creating the breakpoint group 130 based on a hierarchy, according to an embodiment of the invention. The example user interface 500 includes a class hierarchy panel 502, a program listing panel 504, and a group creation menu 506.

The class hierarchy panel 502 shows a hierarchy diagram of the classes and methods that represent the code of the program 127 shown in the program listing panel 504. The debug controller 126 creates the contents of the class hierarchy panel 502 based on the class data 132. Illustrated in the class hierarchy panel 502 are a class A 520, a class B 522, a class C 524 having a method A 530 and a method B 532, a class D 526, and a class E 528. The class A 520 is the parent of the class B 522, which is the child of the class A 520. The class B 522 is the parent of the class C 524, which is the child of the class B 522. The class C 524 is the parent of the class D 526 and the class E 528, which both are the children of the class C 524. The class C 524 has a method A 530 and a method B 532. The classes and methods shown in the class hierarchy panel 502 are exemplary only, and in other embodiments any classes and methods may be present, any class may have any number of children, and any class may have any number of methods. Further, the same method may be associated with multiple classes.

The program listing panel 504 contains a listing of statements in the program 127 to be debugged analogous to those previously described above with reference to FIG. 2.

The user selects a method and a class in the hierarchy shown in the class hierarchy panel 502 and then selects one of the options in the group creation menu 506 via the input device 120, which invokes the debug controller 126 to find all breakpoints in selected methods and class and put those breakpoints in the breakpoint group 130, as further described below with reference to FIGS. 6, 7, and 8.

The methods and classes that the debug controller 126 searches for breakpoints are controlled by the option selected in the group creation menu 506. The group creation menu 506 includes a super method option 560, a sub method option 562, an all methods option 564, a super class option 566, a sub class option 568, and an all classes option 570.

The super method option 560 causes the debug controller 126 to add all those breakpoints to the breakpoint group 130 that are in the selected method and all methods that the selected method overrides in the class hierarchy. In an embodiment, to override a method means to create a method in a child class that replaces a method with the same name that was inherited from the parent class.

The sub method option 562 causes the debug controller 126 to add all those breakpoints to the breakpoint group 130 that are in the selected method and all methods that override the selected method in the class hierarchy.

The all methods option 564 causes the debug controller 126 to add all those breakpoints to the breakpoint group 130 that are in the selected method and all methods that the selected method overrides or are overridden by the selected method.

The super class option 566 causes the debug controller 126 to add all those breakpoints to the breakpoint group 130 that are in the selected class and all classes above the selected class in the class hierarchy. "Above" refers to the ancestors of the selected class, e.g., the parent class, the grandparent class, etc.

The sub class option 568 causes the debug controller 126 to add all those breakpoints to the breakpoint group 130 that are in the selected class and all classes below the selected class in the class hierarchy. "Below" refers to descendants of the selected class, e.g., the children classes, the grandchildren classes, etc.

The all classes option 570 causes the debug controller 126 to add all those breakpoints to the breakpoint group 130 that are in the selected class and all classes above or below the selected class in the class hierarchy.

In this way, the debug controller 126 finds all of the currently set breakpoints in the program 127 that meet the hierarchical selection criteria and adds them to the breakpoint group 130. The user may then request that the debug controller 126 enable, disable, or remove as a group all of the breakpoints in the breakpoint group 130.

Figure 6:
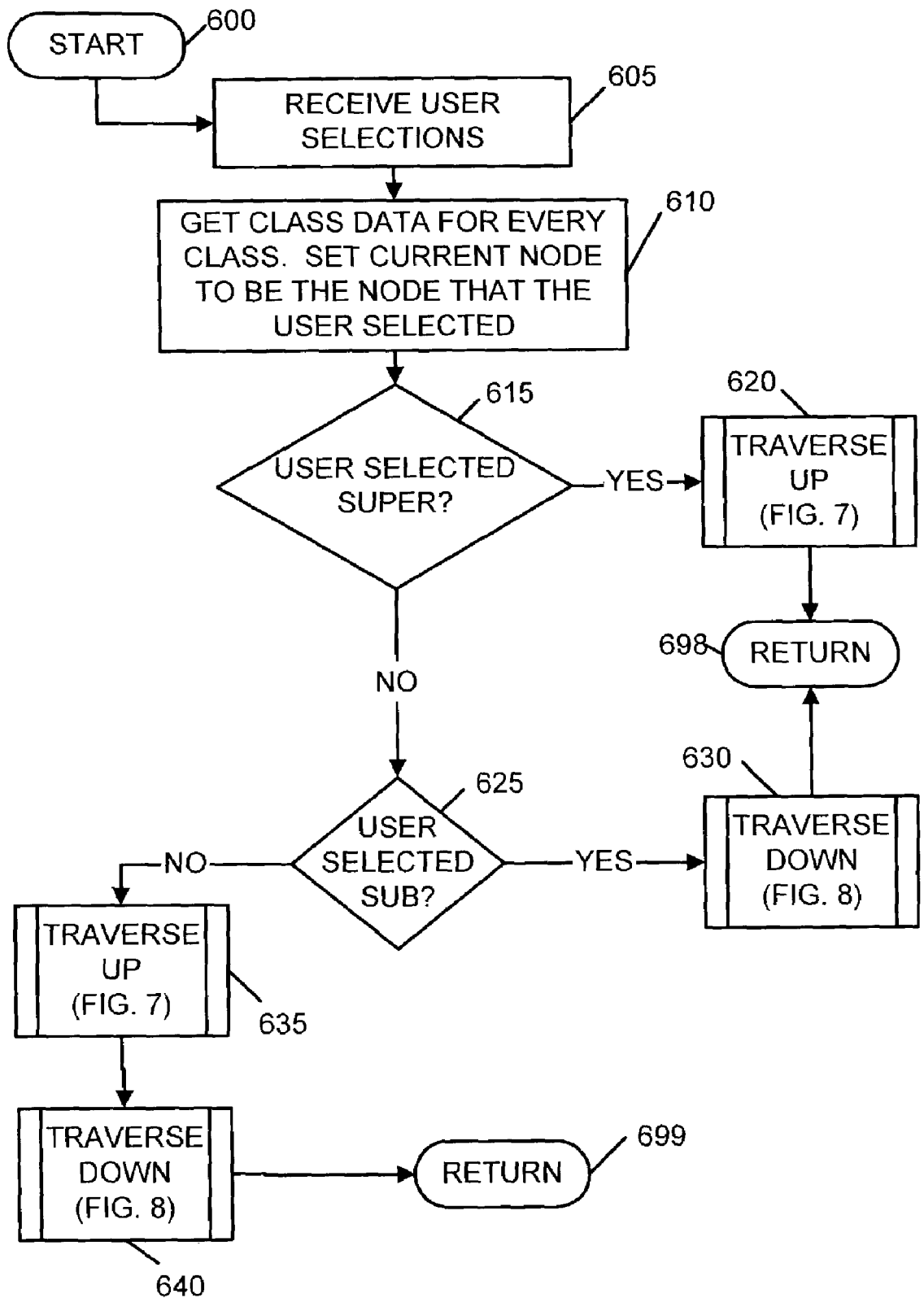
FIG. 6 depicts a flowchart of example processing to create a breakpoint group based on a hierarchy, according to an embodiment of the invention.

FIG. 6 depicts a flowchart of example processing to create the breakpoint group 130 based on a hierarchy, according to an embodiment of the invention. Control begins at block 600. Control then continues to block 605 where the debug controller 126 receives user selections from the user interface 500, as previously described above with reference to FIG. 5. Control then continues to block 610 where the debug controller 126 retrieves the class data 132 for the contents of class hierarchy panel 502 and sets the current node to be the node (the class or method) that user selected in the class hierarchy panel 502.

Control then continues to block 615 where the debug controller 126 determines whether the user selected either the super method option 560 or the super class option 566. If the determination at block 615 is true, then control continues to block 620 where the debug controller 126 traverses up the hierarchy shown in the class hierarchy panel 502 starting at the current node, as further described below with reference to FIG. 7. Control then continues to block 698 where the function returns.

If the determination at block 615 is false, then control continues to block 625 where the debug controller 126 determines whether the user selected either the sub method option 562 or the sub class option 568. If the determination at block 625 is true, then control continues to block 630 where the debug controller 126 traverses down the hierarchy shown in the class hierarchy panel 502 starting at the current node, as further described below with reference to FIG. 8. Control then continues to block 698 where the function returns.

If the determination at block 625 is false, then the user selected either the all methods option 564 or the all classes option 570, so control continues to block 635 where the debug controller 126 traverses up the hierarchy shown in the class hierarchy panel 502 starting at the current node, as further described below with reference to FIG. 7. Control then continues to block 640 where the debug controller 126 traverses down the hierarchy shown in the class hierarchy panel 502 starting at the current node, as further described below with reference to FIG. 8. Control then continues to block 699 where the function returns.

Figure 7:
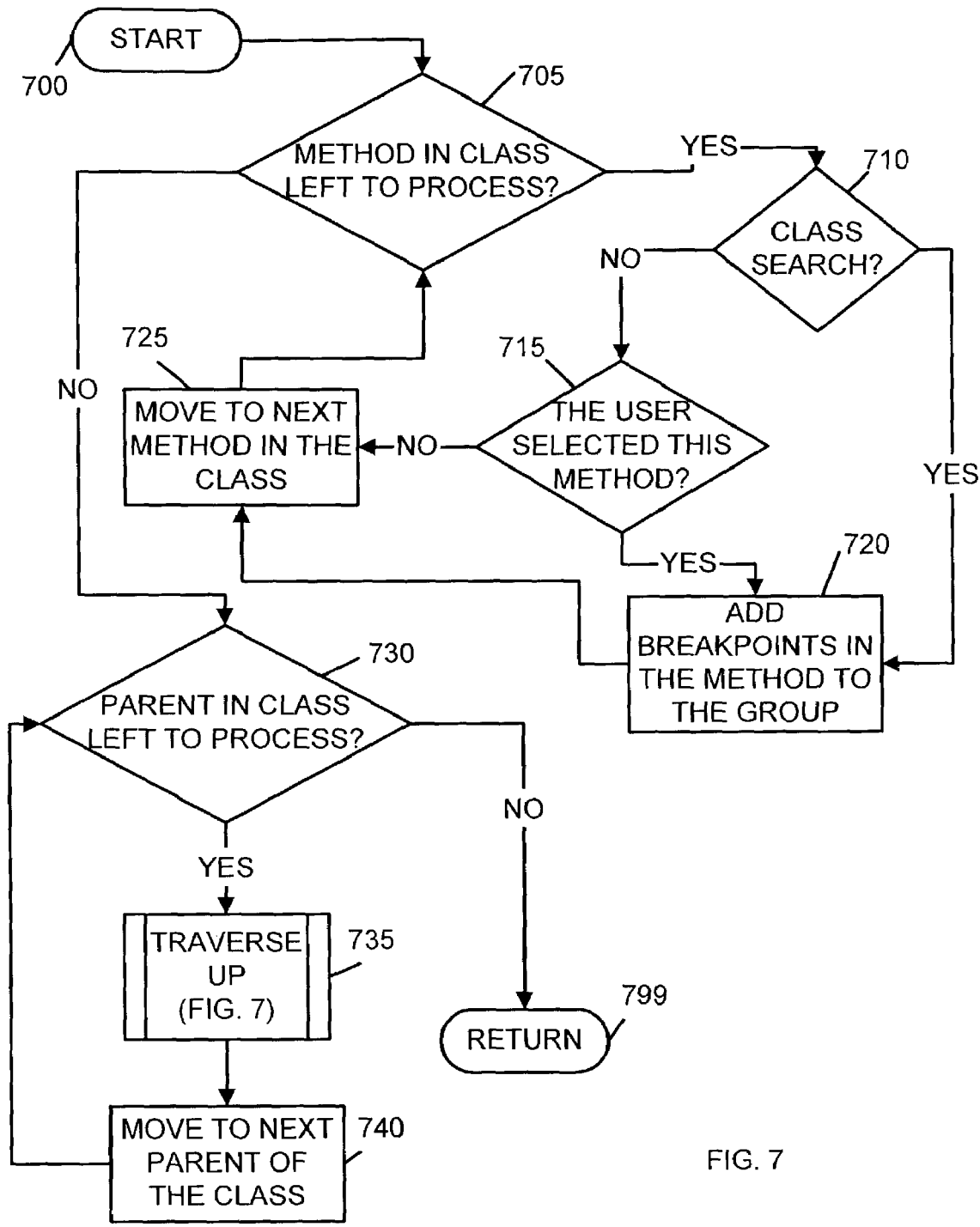
FIG. 7 depicts a flowchart of example processing for traversing up a hierarchy when creating a breakpoint group based on the hierarchy, according to an embodiment of the invention.

FIG. 7 depicts a flowchart of example processing for traversing up the hierarchy shown in the class hierarchy panel 502 when creating the breakpoint group 130 based on a hierarchy, according to an embodiment of the invention. Control begins at block 700. Control then continues to block 705 where the debug controller 126 determines whether there is a method in the current class left to process. If the determination at block 705 is true, then control continues to block 710 where the debug controller 126 determines whether the user selected a class search, i.e., either the super class option 566, the sub class option 568, or the all classes option 570. If the determination at block 710 is true, then control continues to block 720 where the debug controller 126 adds breakpoints that are set in the method to the breakpoint group 130. Control then continues to block 725 where the debug controller 126 moves to the next method in the current class. Control then returns to block 705, as previously described above.

If the determination at block 710 is false, then the user selected a method search, i.e., the super method option 560, the sub method option 562, or the all methods option 564, so control continues to block 715 where the debug controller 126 determines whether the user selected the current method. If the determination at block 715 is true, then control continues to block 720, as previously described above. If the determination at block 715 is false, then control continues to block 725, as previously described above.

If the determination at block 705 is false, then all the methods in the current class have been processed, so control continues to block 730 where the debug controller 126 determines whether the current class has a parent class left to process. If the determination at block 730 is false, then control continues to block 799 where the function returns.

If the determination at block 730 is true, then control continues to block 735 where the debug controller 126 recursively calls the logic of FIG. 7 to traverse up to the parent class of the current class. Control then continues to block 740 where the debug controller 126 moves to the next parent class of the current class. Control then returns to block 730, as previously described above.

Figure 8:
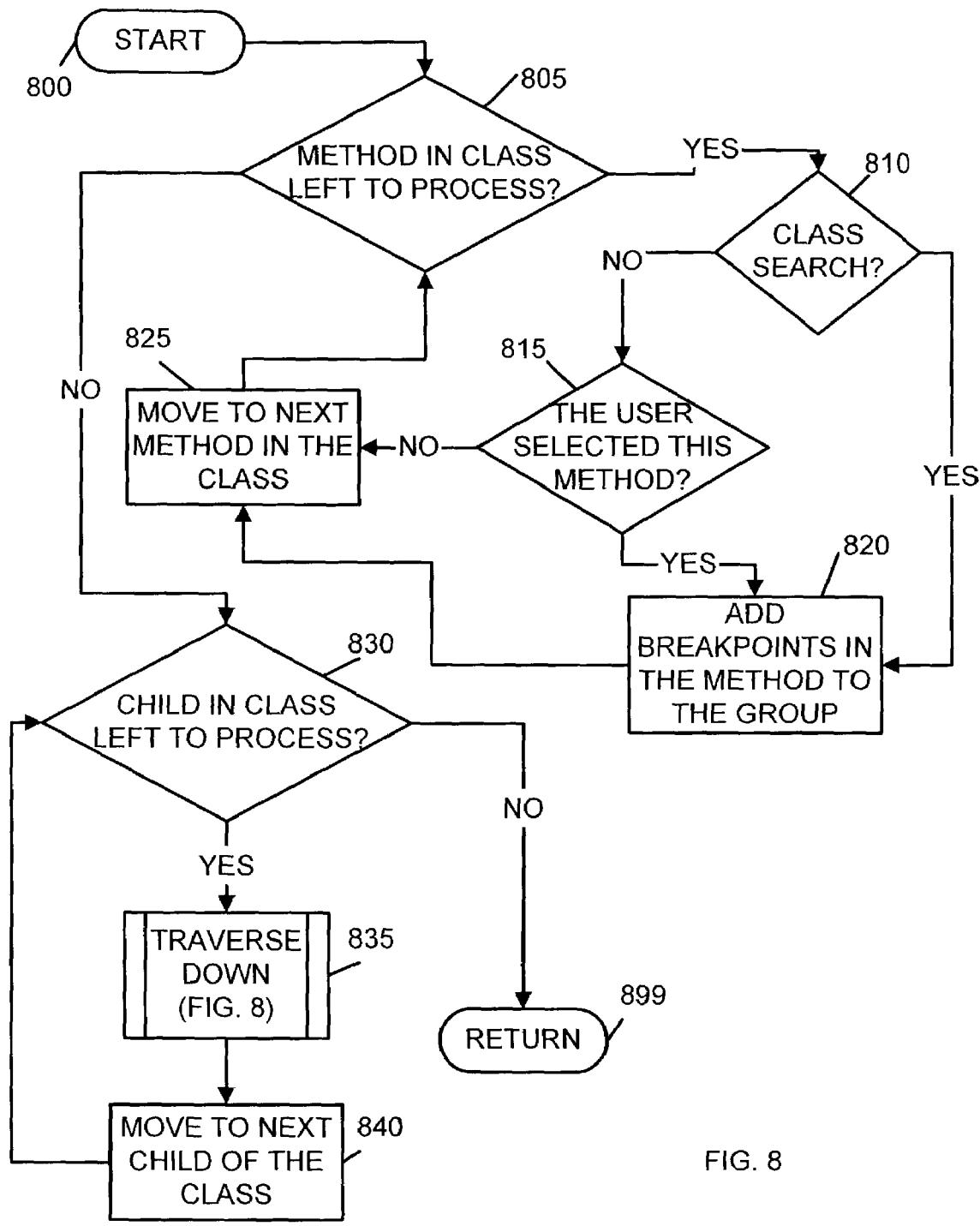
FIG. 8 depicts a flowchart of example processing for traversing down a hierarchy when creating a breakpoint group based on the hierarchy, according to an embodiment of the invention.

FIG. 8 depicts a flowchart of example processing for traversing down the hierarchy shown in the class hierarchy panel 502 when creating the breakpoint group 130 based on a hierarchy, according to an embodiment of the invention. Control begins at block 800. Control then continues to block 805 where the debug controller 126 determines whether there is a method in the current class left to process. If the determination at block 805 is true, then control continues to block 810 where the debug controller 126 determines whether the user selected a class search, i.e., either the super class option 566, the sub class option 568, or the all classes option 570. If the determination at block 810 is true, then control continues to block 820 where the debug controller 126 adds breakpoints that are set in the method to the breakpoint group 130. Control then continues to block 825 where the debug controller 126 moves to the next method in the current class. Control then returns to block 805, as previously described above.

If the determination at block 810 is false, then the user selected a method search, i.e., the super method option 560, the sub method option 562, or the all methods option 564, so control continues to block 815 where the debug controller 126 determines whether the user selected the current method. If the determination at block 815 is true, then control continues to block 820, as previously described above. If the determination at block 815 is false, then control continues to block 825, as previously described above.

If the determination at block 805 is false, then all the methods in the current class have been processed, so control continues to block 830 where the debug controller 126 determines whether the current class has a child class left to process. If the determination at block 830 is false, then control continues to block 899 where the function returns.

If the determination at block 830 is true, then control continues to block 835 where the debug controller 126 recursively calls the logic of FIG. 8 to traverse down the child of the current class. Control then continues to block 840 where the debug controller 126 moves to the next child class of the current class. Control then returns to block 830, as previously described above.

Figure 9:
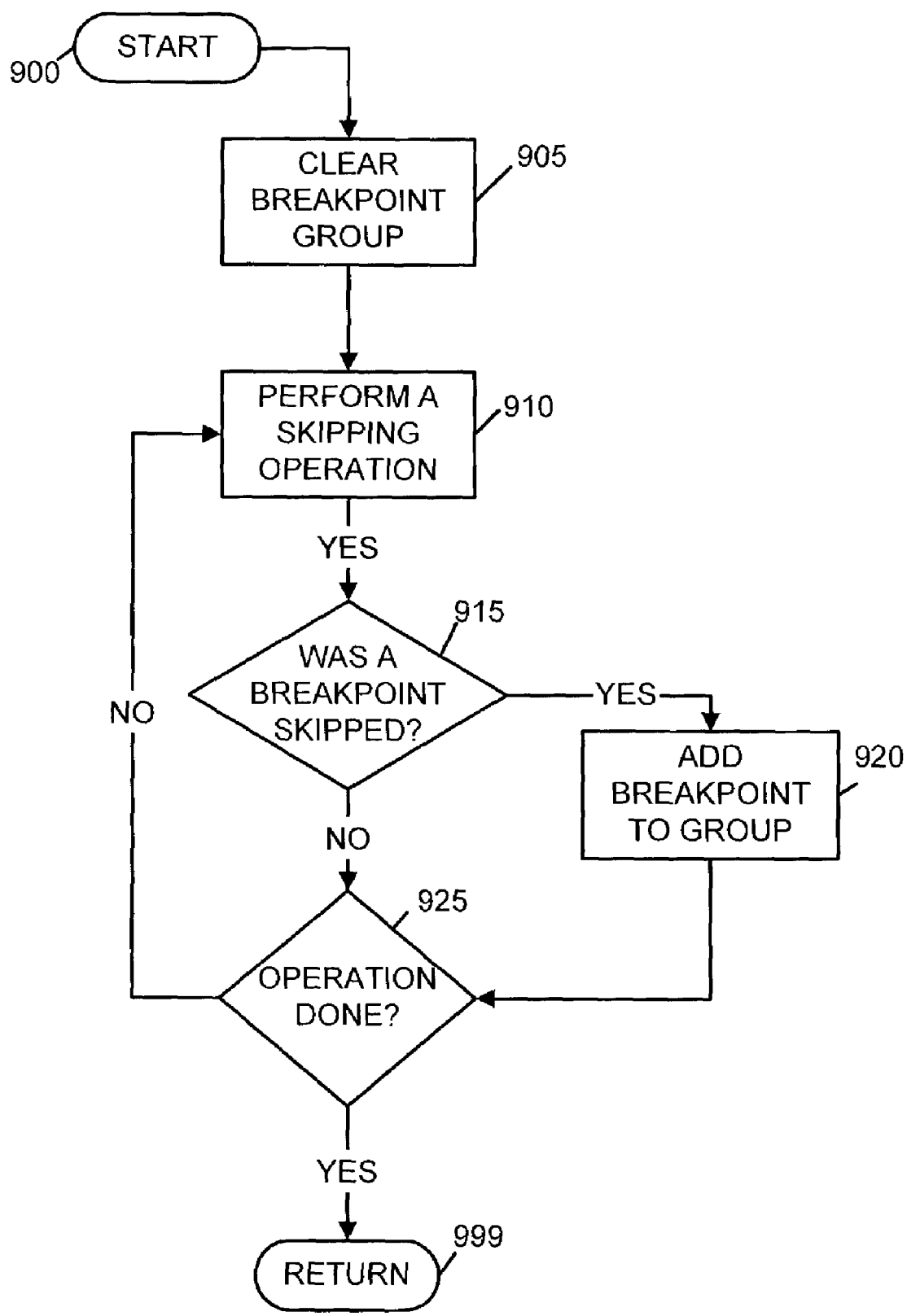
FIG. 9 depicts a flowchart of example processing for creating a breakpoint group based on breakpoints that were skipped, according to an embodiment of the invention.

FIG. 9 depicts a flowchart of example processing for creating the breakpoint group 130 based on breakpoints that were skipped, according to an embodiment of the invention. Control begins at block 900. Control then continues to block 905 where the debug controller 126 clears the breakpoint group 130. In another embodiment, clearing the breakpoint group 130 is optional. Control then continues to block 910 where the debug controller 126 performs a skipping operation during the execution of the program 127. In various embodiments, a skipping operation may be a step-over skipping-breakpoints operation, a run-to-completion operation, a run-to-cursor with skipping operation, or any other operation that will skip (not stop at) at least one set breakpoint.

Control then continues to block 915 where the controller 126 determines whether a breakpoint was skipped during the operation previously describe above with reference to block 910. If the determination at block 915 is true, then control continues to block 920 where the debug controller 126 adds any and all breakpoints that were skipped to the breakpoint group 130. Control then continues to block 925 where the debug controller 126 determines whether the operation is done. If the determination at block 925 is true, then control continues to block 999 where the function returns. If the determination at block 925 is false, then control returns to block 910, as previously described above.

If the determination at block 915 is false, then control continues directly from block 915 to block 925, as previously described above.

In this way, the debug controller 126 finds all of the currently set breakpoints in the program 127 that meet the skipping selection criteria and adds them to the breakpoint group 130. The user may then request that the debug controller 126 enable, disable, or remove as a group all of the breakpoints in the breakpoint group 130.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
receiving a selected method and a hierarchy criteria;
finding a plurality of breakpoints that were set in the selected method;
determining whether the plurality of breakpoints meet the hierarchy criteria based on a plurality of group options, wherein one of the plurality of group options is determining whether the plurality of breakpoints are in at least one method that overrides the selected method in a class hierarchy, and determining whether the plurality of breakpoints are in at least one method that the selected method overrides in the class hierarchy; and
when the plurality of breakpoints does meet the hierarchy criteria, adding the plurality of breakpoints to a breakpoint group.

2. The method of claim 1, wherein another of the plurality of group options is:
determining whether the plurality of breakpoints are in at least one method that the selected method overrides in a class hierarchy.

3. The method of claim 1, wherein another of the plurality of group options is:
determining whether the plurality of breakpoints are in at least one method that overrides the selected method in a class hierarchy.

4. The method of claim 1, wherein another of the plurality of group options is:
receiving a selected class;
determining whether the plurality of breakpoints are in the selected class; and
determining whether the plurality of breakpoints are in any ancestor of the selected class.

5. The method of claim 1, wherein another of the plurality of group options is:
receiving a selected class;
determining whether the plurality of breakpoints are in the selected class; and
determining whether the plurality of breakpoints are in any descendents of the selected class.

* * * * *